United States Patent [19]

Cavallerano et al.

[11] Patent Number: 5,214,501
[45] Date of Patent: May 25, 1993

[54] METHOD AND APPARATUS FOR THE TRANSMISSION AND RECEPTION OF A MULTICARRIER HIGH DEFINITION TELEVISION SIGNAL

[75] Inventors: Alan P. Cavallerano, Ossining; Eberhard Fisch, Yonkers; Mikhail Tsinberg, Riverdale, all of N.Y.

[73] Assignee: North American Philips Corporation, New York, N.Y.

[21] Appl. No.: 614,885

[22] Filed: Nov. 16, 1990

Related U.S. Application Data

[63] Continuation-in-part of Ser. No. 428,278, Oct. 25, 1989, Pat. No. 5,053,860, which is a continuation-in-part of Ser. No. 252,954, Oct. 3, 1988, Pat. No. 5,006,926.

[51] Int. Cl.[5] .................... H04N 11/06; H04N 7/04
[52] U.S. Cl. ......................................... 358/12; 358/141
[58] Field of Search ........................... 358/12, 141, 13

[56] References Cited

U.S. PATENT DOCUMENTS

| | | | |
|---|---|---|---|
| 4,694,338 | 9/1987 | Tsinberg | 358/141 |
| 4,794,447 | 12/1988 | Tsinberg | 358/141 |
| 4,908,697 | 3/1990 | Tsinberg et al. | 358/12 |
| 4,974,064 | 11/1990 | Tsinberg | 358/12 |
| 4,992,853 | 2/1991 | Cavallerano | 358/12 |
| 4,999,701 | 3/1991 | Cavallerano et al. | 388/12 |
| 5,006,926 | 4/1991 | Tsinberg | 358/12 |
| 5,053,860 | 10/1991 | Tsinberg | 358/12 |
| 5,055,915 | 10/1991 | Tsinberg | 358/12 |
| 5,081,521 | 11/1992 | Faroudja | 358/12 |

*Primary Examiner*—John K. Peng
*Attorney, Agent, or Firm*—Michael E. Marion

[57] ABSTRACT

A method and apparatus for generating and receiving a high definition television signal suitable for use in a broadcasting environment wherein a conventional television signal is also used, having multiple frequency multiplexed subcarriers placed within the frequency spectrum of the signal so as to minimize interference with and from the conventional television signal.

17 Claims, 6 Drawing Sheets

METHOD AND APPARATUS FOR THE TRANSMISSION AND RECEPTION OF A MULTICARRIER HIGH DEFINITION TELEVISION SIGNAL

This application is a continuation-in-part of Ser. No. 428,278, filed Oct. 25, 1989, now U.S. Pat. No. 5,053,860, issued Oct. 1, 1991 and a continuation-in-part of Ser. No. 252,954, filed Oct. 3, 1988, now U.S. Pat. No. 5,006,926, issued Apr. 9, 1991.

CROSS REFERENCE TO RELATED APPLICATIONS AND PATENTS

1. U.S. application 856622 and now U.S. Pat. No. 4,694,338, issued Sep. 15, 1987;
2. U.S. application 931756 and now U.S. Pat. No. 4,794,447, issued Dec. 27, 1988;
3. U.S. application 077557 and now U.S. Pat. No. 4,908,697, issued Mar. 13, 1990;
4. U.S. Pat. No. 4,974,064, issued Nov. 27, 1990;
5. U.S. Pat. No. 5,006,926, issued Apr. 9, 1991;
6. U.S. Pat. No. 4,992,853, issued Feb. 12, 1991;
7. U.S. Pat. No. 5,505,915, issued Oct. 8, 1991;
8. U.S. Pat. No. 5,126,323, issued Jun. 30, 1992;

The above referenced patents and applications are all assigned to the same assignee, have common inventorship, and are specifically incorporated by reference herein.

BACKGROUND OF THE INVENTION

The grandparent No. and now U.S. Pat. No. 5,006,926 descries a method and apparatus for generating a frequency multiplexed multi-carrier high definition television (HDTV) signal including a digital sound and sync (DSS) signal. The parent No. and now U.S. Pat. No. 5,053,860 incorporates baseband and RF processing necessary to reduce the bandwidth of an HDTV source signal to that of a conventional television signal, for example 6 MHz at RF and describes a format for the signal referred to as "HDS/NA-6" which can be used with an IIDTV source signal having for example, 525 lines, 1:1 progressive scanning or 1050 lines, 2:1 interlaced scanning and can be used to implement a "simulcast" approach for broadcasting HDTV television signals wherein maximum advantage is taken of the existing broadcast spectrum.

The so called "simulcast" approach utilizes one conventional television channel to transmit a the HDTV signal (which cannot be received as transmitted by a conventional television receiver), and a second television channel to transmit a conventional television signal which can provide the same programming as the HDTV signal to conventional, e.g. NTSC, receivers. As used herein, the word "conventional" is defined to mean a standard television channel used in terrestrial television broadcasting, cablecasting and recording, for example a 6 MHz television channel. Since the simulcast approach will initially involve allotting additional channel space to each television station, it will be necessary to provide a system which will allow broadcasters to use the so called "taboo" channels in their area.

When television stations are planned and licensed co-channel interference is taken into consideration. Transmission is precluded on a particular channel in a second city, when the same channel is being used for broadcasting in a nearby city, as determined and regulated by the F.C.C. Although there are other taboo channel considerations, they are generally considered in the industry to be receiver-design taboos, and are not fundamentally insurmountable. However, it is the co-channel interference which causes direct one-on-one interference. Transmission of a "simulcast" HDTV signal on channel A would therefore be considered to be an "interferer" with a conventional transmission also transmitting on channel A, and vice versa, if they are being respectively transmitted in cities which are close enough so that channel A is considered a "taboo" channel in one of them. Such interference is usually described in terms of "D to U" ratios; i.e. Desired signal to Undesired signal ratios.

The parent application, which is specifically incorporated herein by reference, describes a method and system for providing a frequency multiplexed single channel HDTV signal suitable for conventional terrestrial and cable AM broadcasting environments. The signal features a configuration in which carriers may be suppressed and standard sync headroom eliminated. In addition, due to the use of heavy expansion of the signal components derived during the encoding process, performance similar to the signal-to-noise ratio of a conventional broadcast signal can be obtained with a significant reduction in carrier level. The grandparent application describes a method and apparatus for converting a plurality of video and audio components derived from an HDTV source signal into an amplitude modulated RF signal. The video components are derived according to the teachings of the references incorporated herein, which share common inventorship and a common assignee. In particular, the following video components are illustrated and will be used in describing the embodiments presented in the instant application. They are derived in accordance with the methods and apparatus taught in U.S. Pat. No. 4,908,697 which issued on Mar. 13, 1990. These components are:

Y1n, which is a "narrow" bandwidth luminance signal component derived from a first TV line;

Y3w, which is a "wide" bandwidth luminance signal component derived from a third TV line;

CRw, for example U1n, which is a "wide" bandwidth chroma difference signal derived from a first TV line;

CRn, for example V3w, which is a "narrow" bandwidth chroma difference signal derived from a third TV line;

LD2, which is a line difference signal component which can be derived, for example by the formula LD=B-(A+C)/2, where B is a value of a pixel at a particular line and A and C are corresponding pixels vertically above and below pixel B respectively;

LD4, which is a second line difference signal component; and a DSS packet for transmitting digital sync, clamp period and "CD" quality digital audio.

The components are derived from an HDTV source input having a line sequence of lines 1,2,3,4.

In the parent application, each of the video components are expanded by the factor 27/5. The line difference signals, LD2 and LD4, are modulated in quadrature on a first suppressed sub-carrier and interleaved with both luminance components Y1n and Y3w, much the way chrominance is frequency interleaved in an NTSC signal but with a much smaller interleaving penalty due to the low-energy nature of LD and its spectral composition as vertical detail. The double sideband (DSB) narrowband chrominance signal Crn (U1n) is modulated in quadrature with the narrowband luminance signal Y1n (which contains the imbedded, interleaved quadrature modulated LD components) and filtered as a vestigial sideband (VSB) signal on a second suppressed subcarrier. Similarly, components Y3w and Crw (V3w) are quadrature modulated on a third suppressed subcarrier, with Y3w filtered as a VSB signal. Digital sync and sound signals (DSS) are encoded on a fourth sub-carrier. The four sub-carriers are frequency multiplexed with each other to form the HDS/NA-6 signal.

It has been found that peak power occurs most frequently in the vicinity of the suppressed subcarriers which essentially carry the dense, low-frequency content of a typical image. The packaging of the signal shown in the parent application featured the frequency multiplexed components positioned on the RF signal such that the Yn and Y3w subcarriers faced the inside of the channel, with their upper sideband portions facing away from each other. This orientation poses a problem in terms of interference between the HDS/NA-6 signal configured as described in the parent application and a conventional NTSC television signal present on a taboo co-channel.

The invention herein represents an improvement to the system and signal packaging taught in the parent application and provides a solution to the potential problems associated with using taboo channels.

The instant invention has as one object, to minimize interference between television signals on co-channels. Yet another object of the invention is to maximize the use of available television broadcasting channels by minimizing or eliminating co-channel interference on or between so called taboo channels.

SUMMARY OF THE INVENTION

One of the features of the HDS/NA-6 signal as described in the parent application, was that the subcarriers were frequency-agile, and could placed at any position within the signal package. It is a feature of the instant invention, that the video subcarriers of the television signal comprising the invention, are placed towards the outer extremities of the channel. By placing the carriers at the "ends" of the channel, the subcarriers appear "hidden" to an NTSC receiver thus minimizing interference with an NTSC signal. The most significant feature of the instant application is that the subcarriers of the HDS/NA-6 signal are positioned so that they least effect the potentially interfered with NTSC signal and so that information supplied on the HDS/NA-6 channel is least interfered with by the carriers of the NTSC signal.

Although the embodiment of the invention described herein features an analog signal, the principle of creative subcarrier placement which comprises the invention, would be equally applicable to a multi-carrier digital (or hybrid) signal as well.

Since the picture carrier of an NTSC signal holds a significant cluster of energy because it transmits the heavily concentrated DC and low frequency luminance portion of the video image, and the NTSC color subcarrier similarly holds the heavily-concentrated quadrature cluster of DC and low frequency chrominance energy, nominally 10 dB below the NTSC picture carrier, a receiver designed to decode the instant television signal, i.e. one having video subcarriers at the ends of the channel bandwidth, will be minimally effected by the centrally placed NTSC carriers of a conventional signal broadcast on a taboo co-channel.

The following additional features are provided by the instant embodiment of the invention:
"bandsplitting" the luminance signal into high frequency and low frequency components for taboo-friendly transmissions;
sending a "luminance difference" signal for Y1n, which reduces output transmission power and reduces the potential for quadrature distortion upon demodulation;
orienting the upper sidebands of Y1n and Y3w to face each other allowing the LD signals to be modulated in quadrature and selectively replace the upper extremities of Y1n and Y3w. Although LD can replace the upper extremity of Y3w only, this will cut into Y3w more heavily;
placing quadrature modulated LD for a first field X, (e.g. an odd field) in the upper sidebands of luminance, requiring temporal pre- and post-filtering of YH upper sidebands, and placing quadrature modulated LD for a subsequent field X+1 (e.g. an even field) in place of quadrature modulated chrominance (forcing alternate-field chrominance), requiring temporal pre- and post- filtering of chrominance;
allowing for the dithering of the low frequency luminance carrier, which will perceptually mask interference of beat frequencies with a co-channel NTSC picture carrier.

In order to properly address the co-channel taboo broadcast-compatibility issues, several system-level adaptations are required vis-a-vis the embodiment of the system and method described in the parent application. Some of these changes specifically focus on interference issues; others relate to an overall improvement in the packaging of the information in the 6 MHz IF or RF channel, and overall system performance in a real broadcast environment. In particular the instant invention comprises an enhanced form of placement of the LD signal in place of selected luminance sidebands by time and frequency multiplexing rather than by interleaving within the sidebands. The invention also comprises quadrature modulating two luminance signals together and two chrominance signals together, rather than mixing luminance and chrominance in quadrature as suggested in the parent application. Interference issues are further addressed by the instant invention, by careful placement of the video subcarriers, and bandsplitting of luminance components. Using (Y1-Y3)L and Y3L, in quadrature (as explained below) reduces quadrature distortion, and demodulation errors as compared to the use of Y1 and Y3 directly modulated in quadrature.

These and other objects, advantages, aspects and features of the instant invention will be more fully understood and appreciated upon consideration of the following detailed description of the preferred embodiments presented in conjunction with the accompanying drawings.

DETAILED DESCRIPTION OF PREFERRED EMBODIMENTS OF THE INVENTION

Figure 1:
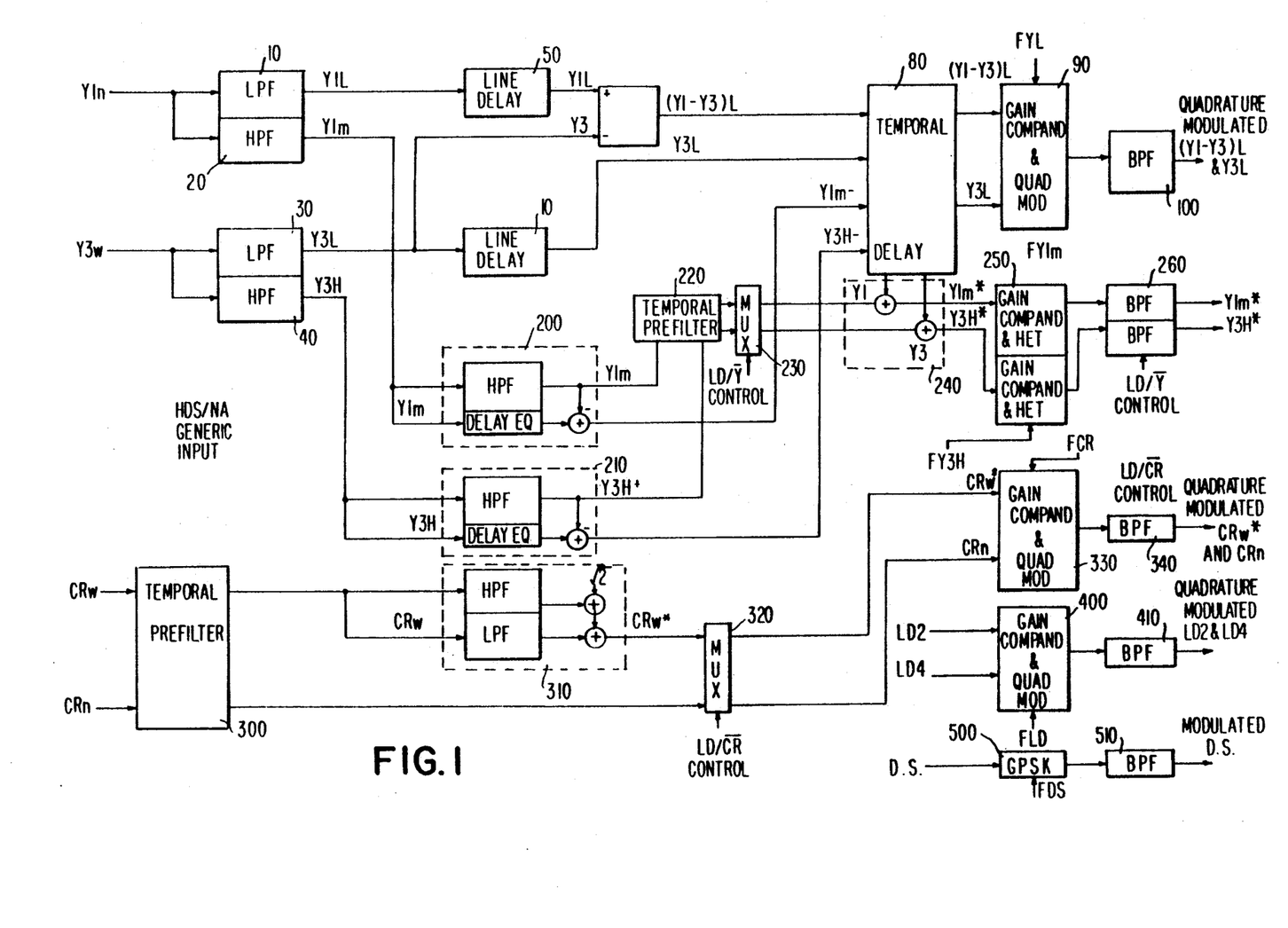
FIGS. 1 and 2 describe one embodiment of an encoder comprising the invention.
Figure 2:
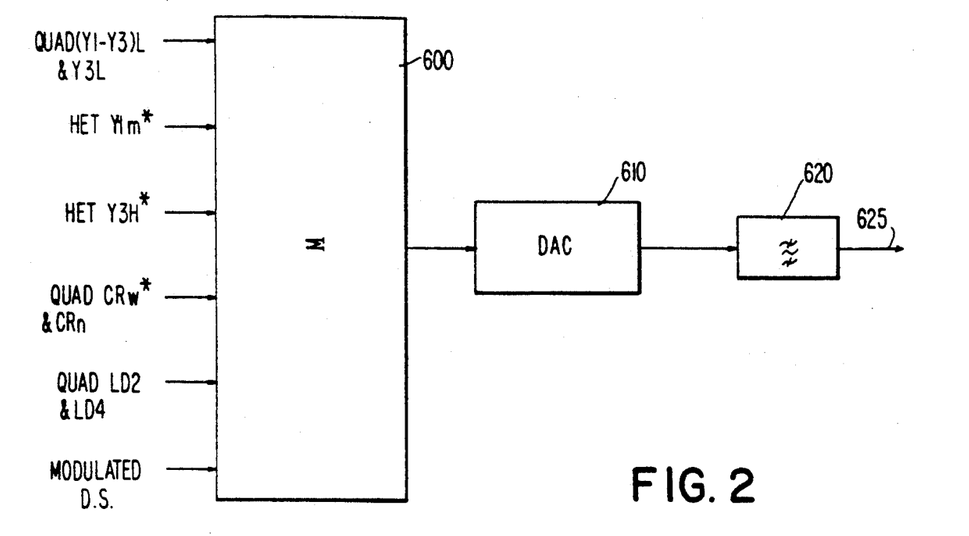

After an HDTV source signal is divided into video components, as described herein and in the references incorporated herein, the components are processed by the encoder described in FIGS. 1 and 2. The horizontal resolution baseband bandwidth expressed in both MHz and television lines per picture height (TVL/PH) are given in Table A.

TABLE A

| SOURCE | HORIZONTAL RESOLUTION BASEBAND BANDWIDTH (MHz) | TVL/PH |
|---|---|---|
| Y1n | 6.8 | 200 |
| Y3w | 16.96 | 500 |
| CRw ("I") | 4.2 | 124 |
| CRn ("Q") | 2.1 | 62 |
| LD2 | 3.0 | 88 |
| LD4 | 3.0 | 88 |
| Digital Audio | 250 kHz allocated at IF | |

Narrowband luminance Y1n is separated ("bandsplit") into low frequencies (low frequency luminance component Y1L) using lowpass filter 10 and into high frequencies (high frequency luminance component Y1m) using highpass filter 20. Wideband luminance, Y3w is bandsplit into low frequencies (low frequency luminance component Y3L) using lowpass filter 30 (which has the same characteristics as filter 10, and may share that filter by time multiplexing) and into high frequencies (high frequency luminance component Y3H) using highpass filter 40 (which has a similar characteristic as filter 20, but with a higher cutoff frequency for the high frequencies due to the wider bandwidth of Y3H versus Y1m).

The Y1L component is delayed using line delay 50 to be time-aligned with Y3L. These components are processed by adder 60 to generate a luminance difference component (Y1-Y3)L. Y3L is also delayed by line delay 70 such that (Y1-Y3)L and Y3L are presented to the next level of processing in a time-aligned manner (this delay may, of course, be absorbed in downstream delay paths, but is included here for ease of description).

The (Y1-Y3)L and Y3L components are temporally delayed by frame stores in the temporal delay block 80, a known device. The amount of delay is dependent upon the length of temporal filters to be described later, but should be a small number of frames, perhaps one or two. The (Y1-Y3)L and Y3L components are then modulated in quadrature on carrier FYL in the quadrature modulator block 90. This block also allows the components to be gain-level adjusted and companded before modulation and before transmission. Finally the quadrature modulated YL components are bandpass filtered by bandpass filter 100 to remove modulation products.

The high frequency luminance components as derived are Y1m and Y3H, where Y1m has midrange frequencies as opposed to Y3 high frequencies, due to the inherently lower bandwidth of Y1n.

The Y1m and Y3H signals are further bandsplit into upper frequency upper sidebands (Y1m+ and Y3H+, respectively) and lower frequency upper sidebands (Y1m− and Y3H−) in blocks 200 and 210, respectively, which are both horizontal filter blocks comprising high pass filters and delay equalizers. The HPF output of blocks 200 and 210 directly provides the upper frequency upper sideband Y1m+ and Y3H+ components, and when these components are subtracted from respective delay-equalized input signals, the lower frequency upper sidebands Y1m− and Y3H− components are generated. The Y1m+ and Y3H+ components are temporally prefiltered using temporal prefilter 220, a known device, which prepares these components for temporal decimation. The temporal decimation occurs at a 59.94 Hz frame rate using a multiplexer 230 as a decimator to alternately select between the temporally-filtered upper frequency upper sidebands of luminance and "ground" or "zero". A control signal called $LD/\overline{Y}$ toggles at the frame rate to control the decimation, so that luminance is passed every other frame. The horizontal resolution baseband bandwidth of the components derived by the encoder of FIG. 1, expressed in both MHz and TVL/PH, are given in Table B.

TABLE B

| COMPONENTS | HORIZONTAL RESOLUTION BASEBAND BANDWIDTH (MHz) | TVL/PH |
|---|---|---|
| Y1L | 3.0 | 88 |
| Y3L | 3.0 | 88 |
| (Y1-Y3)L | 3.0 | 88 |
| Y1m | (3.0 to 6.8) | 88 to 200 |
| Y1m− | (3.0 to 4.8) | 88 to 141 |
| Y1m+ | (4.8 to 6.8) | 141 to 200 |
| Y3H | (3.0 to 16.96) | 88 to 500 |
| Y3H− | (3.0 to 12.96) | 88 to 382 |
| Y3H+ | (12.96 to 16.96) | 382 to 500 |
| CRw | DC to 4.2 | 124 |
| CRw+ | 2.1 to 4.2 | 62 to 124 |

The lower frequency upper sideband luminance components, Y1m− and Y3H−, are temporally delayed in block 80 to match the temporal delay of Y1m+ and Y3H+ which have been temporally prefiltered. Then, Y1m− and Y3H− are combined respectively with the temporally prefiltered Y1m+ and Y3H+ in adder block 240 yielding Y1m*=(Y1m−)+(Y1m+), and Y3H*=Y3H−+Y3H+.

Components Y1m* and Y3H* are then each heterodyned with separate carriers by heterodyne block 250 which also allows for gain adjustment and companding for transmission. The carrier frequencies are FY1m and FY3H, respectively. The heterodyned components are then bandpass filtered by bandpass filter block 260 to remove unwanted heterodyne products. Note that in order to achieve the Y1m* orientation recommended for the format, the upper-order modulation product is to be preserved by the bandpass filter 260 and the lower-order term is to be rejected. The bandpass filter is controlled by the $LD/\overline{Y}$ control signal, in order to lower the upper cutoff frequency for the Y1m* term and increase the lower cutoff frequency for the Y3H* term, in accordance with the temporal decimation of these sidebands.

CRw and CRn are temporally prefiltered in temporal prefilter 300. This prefilter prepares each chrominance signal for temporal decimation on a field-by-field basis.

Because the CRw signal is transmitted as a Vestigial Sideband (VSB) signal, the reconstruction at the receiver would normally require either Nyquist-slope filtering, or a special highpass filter. An alternative presented here allows for transmission of the upper sideband of the CRw signal to be transmitted with additional gain, by a factor of square root of two (this factor comes from the fact that a quadrature signal upon transmission is attenuated by the square root of two, but demodulation increases the amplitude by a factor of two for double sideband components—hence the receiver demodulates two over the square root of two, which equals the square root of two) with respect to the lower quadrature (CRw and CRn) double sideband components. Filter block 310, a known device, extracts the upper sideband of Crw with a highpass filter, boosts the amplitude by the factor of square root of two, and adds the boosted upper sideband to the lower sideband, which was generated with the lowpass filter. The signal output from filter block 310 is denoted as CRw*.

CRw* and CRn are decimated at a 59.94 Hz frame rate to be out of phase with respect to the upper frequency upper sideband decimation of luminance previously described. This is accomplished with the multiplex block, 320. A control signal called LD/CR̄ manages the decimation sequencing.

The temporally filtered and decimated chrominance signals CRw* and CRn are quadrature modulated in block 330 on a carrier FCR. CRW* has a boosted upper sideband, and after modulation, a bandpass filter 340, a known device, removes the upper frequency upper sideband for this term on one side, thus creating a VSB. The quadrature modulator 330 also provides overall gain and companding control for transmission. The bandpass filter 340 removes modulation products, and also forces the output to zero in accordance with the LD/CR̄ control.

LD2 and LD4 are modulated in quadrature in block 400 on carrier FLD. The modulator has gain and companding control for transmission. Bandpass filter 410 removes unwanted modulation products.

The digital sound and sync signals are modulated on a carrier FDS in block 500, which may be a QPSK modulator, a known device. Bandpass filter 510, removes unwanted modulation products.

Figure 7:
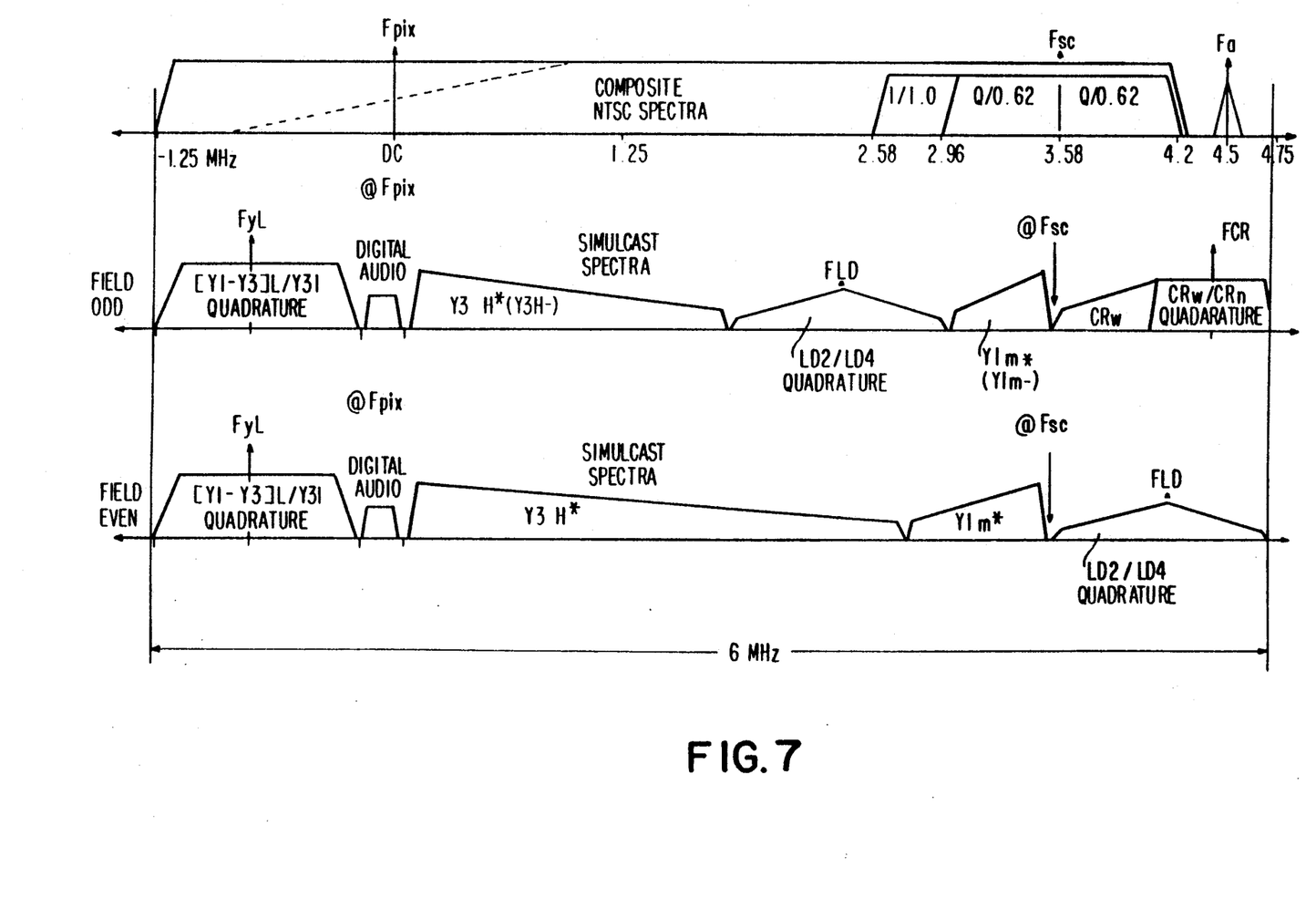
FIG. 7 compares the NTSC transmission spectrum of a conventional television signal with the transmission spectrum of odd and even fields of one embodiment of an HDS/NA-6 signal configured in accordance with the invention.

FIG. 7 compares the frequency spectrum of a composite NTSC signal with odd and even fields of an HDS/NA-6 signal encoded in accordance with the invention. The components are frequency multiplexed in accordance with the spectral allocation shown in FIG. 7. In both the odd and even fields of the HDS/NA-6 signal, allowance is made in the frequency spectrum for the presence of the picture color subcarrier and audio carriers of the NTSC signal. Similarly, the luminance subcarrier FYL in both the odd and even fields are placed at a point which least effects the NTSC signal since it occurs at a point where Nyquist filtering of the NTSC signal is most effective. Similarly, no energy is generated at the frequency at which the color subcarrier of the NTSC signal occurs. The odd field of the NSA/6 signal substitutes the FLD carrier carrying the LD2 and the LD4 signals, for a portion of the Y3H* signal so that only Y3H− is broadcast in that field. In the even field, however, the total Y3H* signal is broadcast and the FLD subcarrier substituted for the chrominance subcarrier FCR.

All components may be added in adder block 600 to form one stream of data in the time domain, as shown in FIG. 2. The adder output is converted to an analog signal in the digital-to-analog converter block 610, a known device, and bandpass filtered to remove spectral repeats in bandpass filter block 620.

The encoder output 625 thus represents a continuous stream of information in the time domain which contains frequency-multiplexed and quadrature modulated HDS/NA generic components, some of which have been temporally prefiltered. This output signal is at a "low" IF (Intermediate Frequency) and is available to be modulated to a higher IF and then to a channel (RF) frequency, or may be directly heterodyned to RF.

Generation of Special Carriers and Control Signals

Figure 3:
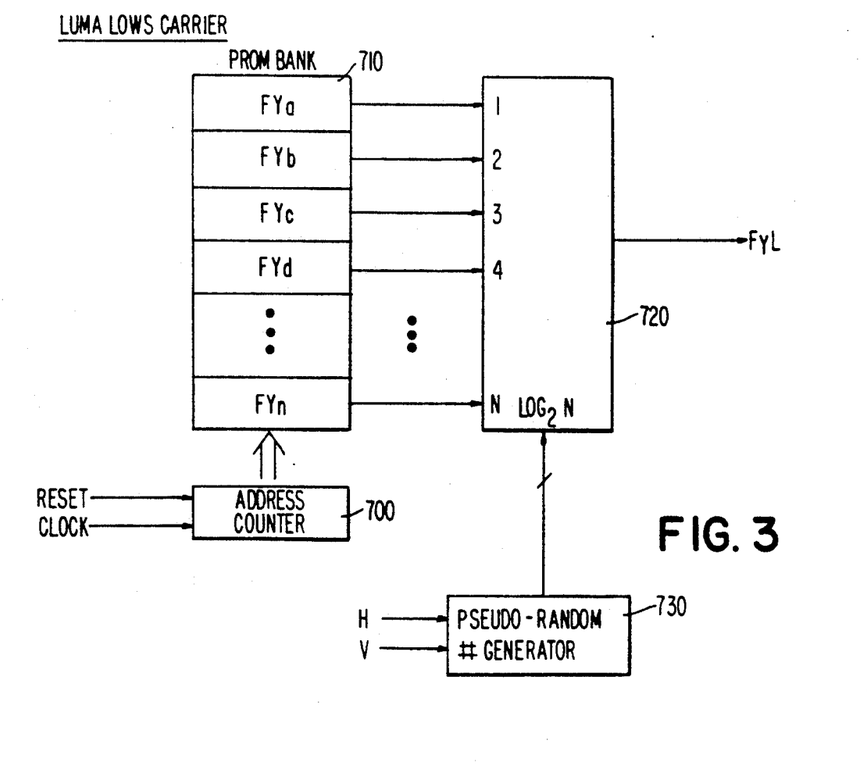
FIG. 3 describes apparatus for generating a low frequency luminance carrier.

As previously described, it is advantageous to perceptually disrupt the beat of the bandsplit low frequency information with the NTSC picture by dithering the modulation quadrature carrier FYL slightly. The carrier frequency is pseudo-randomly dithered at the transmission line rate of nominally 7.2 KHz by nominally $+/-3.6$ KHz. Thus, as depicted in FIG. 3, a counter 700 is clocked at the line sample rate and reset every output line of nominally 139 used in duration. The counter addresses all of the PROMS in the PROM 710 to produce a family of digital carrier frequencies. These carrier frequencies, perhaps 32, 64, or 128 of them, are close in frequency to a particular FYL. On a line-by-line basis, reset every field (temporal frame or field dithering may also be applied), each carrier frequency is selected according to a pseudo-random order "key" stored at both the encoder and decoder, by data selector block 720, a known device, as controlled by the line-varying and field-reset pseudo-random number generator block 730. Thus, the carrier frequency of FYL is changed slightly on each output line in a pseudo-random manner according to the key.

Figure 4:
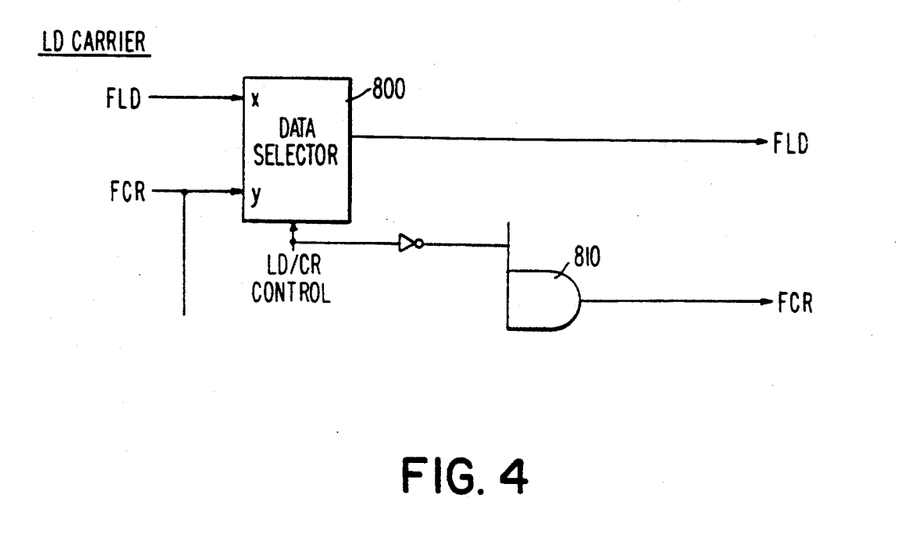
FIG. 4 describes apparatus for generating an LD carrier.
Figure 5:
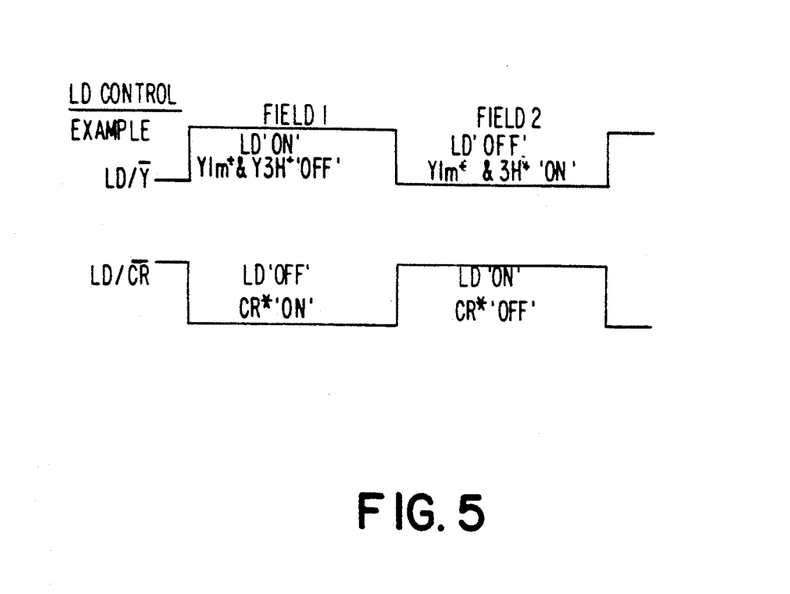
FIG. 5 describes the change in LD carrier frequency in accordance with the invention.

The LD carrier frequency must change on a field-by-field basis to place LD in the position of the upper frequency upper sidebands of luminance for alternate fields, as previously described. FIG. 4 shows how a data selector block 800 can take the basic carrier frequencies for LD (FLD) and chrominance (FCR) and route the appropriate carriers to the modulators. Thus, the LD carrier at the LD modulator block 400 is at the frequency of the upper frequency upper sidebands of luminance for fields Xn, where n is an integer, and is at the chrominance carrier frequency fields Xn.1, as routed by the previously-described control signal LD/CR̄. Also, the chrominance carrier at the chrominance modulator block 330 is at the frequency FCR for fields Xn, and is turned off for fields Xn+1, as accomplished with the simple logical AND gate 810, a known device. The LD control signals previously referenced are shown pictorially in FIG. 5.

Decoder Embodiment

The decoder will generate from the received encoded signal, baseband HDS/NA components. The decoder input is assumed to be at the "low" IF (after moving the signal from the channel carrier to a precise "low" IF carrier in the receiver). A preferred decoder embodiment is described in FIG. 6. It is assumed that the input signal is first digitized in the receiver.

Figure 6:
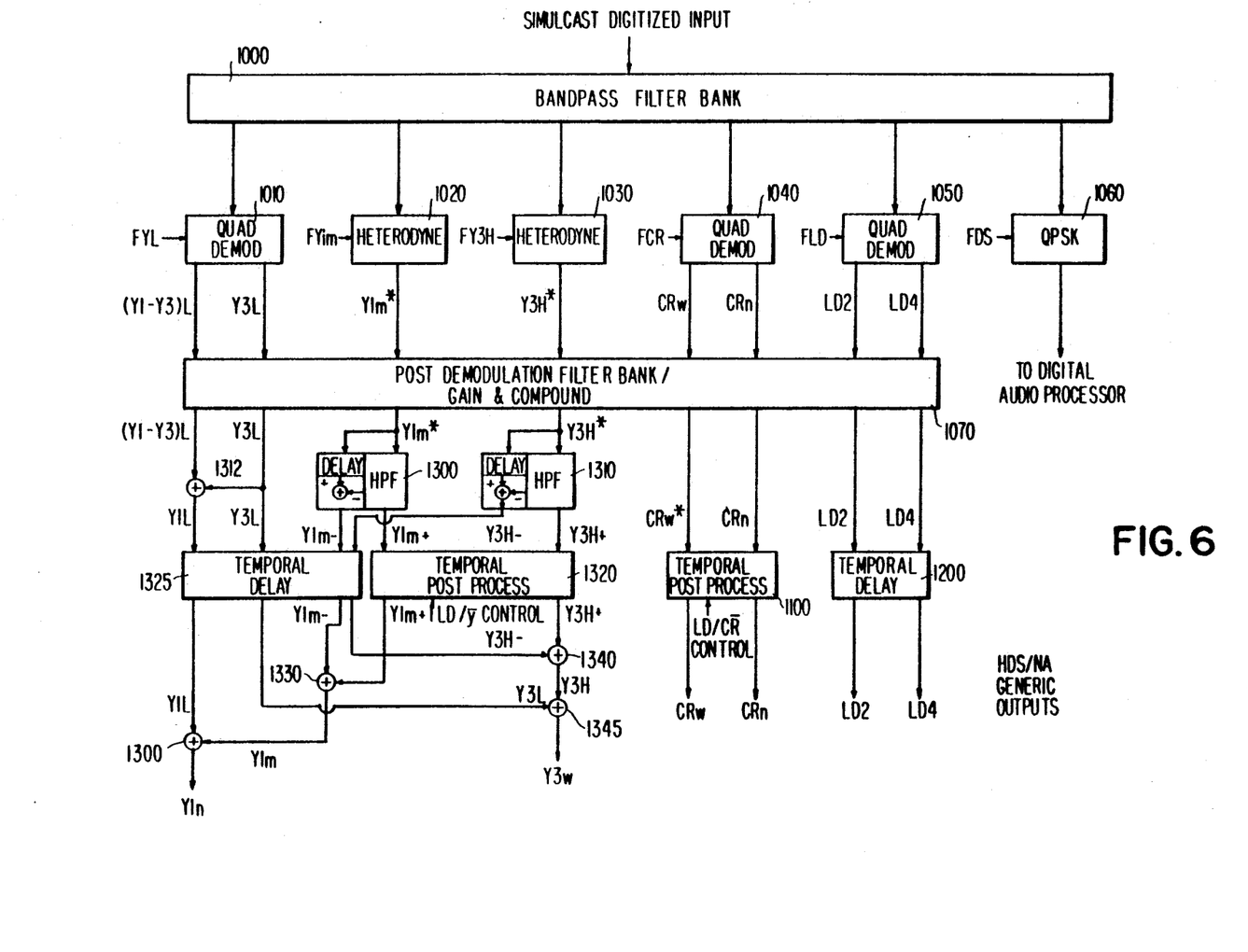
FIG. 6 describes one embodiment of a decoder comprising the invention.

The frequency multiplexed signal is separated into frequency bands corresponding to their modulated spectral allocations. Frequency separation is accomplished via the bandpass filter bank 1000, which is comprised of a separate bandpass filter for each received modulated component. Therefore, the frequency multiplexed signal has been broken down into the modulated signals that were input to the adder block at the Encoder.

As discussed in the references incorporated herein, pilot carriers are recovered and are used to regenerate all of the carrier frequencies used for modulation at the Encoder, including: FYL, FY1m, FY3H, FCR, FLD, and FDS.

Each modulated signal is demodulated as follows:

1. FYL is quadrature demodulated to baseband in quadrature demodulator block 1010, a known device, generating (Y1-Y3)L and Y3L at baseband;
2. Y1m* is heterodyned back to its "source" position from carrier FY1m in heterodyne block 1020;
3. Y3H* is heterodyned back to its "source" position from carrier FY3H in heterodyne block 1030;
4. FCR is quadrature demodulated to baseband in quadrature demodulator block 1040 generating CRw* and CRn.
5. FLD is quadrature demodulated to baseband in quadrature demodulator block 1050 generating LD2 and LD4; and
6. D.S. is demodulated from carrier FDS using the QPSK demodulator block 1060 and the digital audio is processed by a digital audio processor, a known device.

All components are separately post filtered after demodulation using the post demodulation filter block 1070, which removes unwanted post modulation products. This block also normalizes gain levels to correspond to the source input, which may have been intentionally distorted for transmission at the Encoder. The signals are also "decompanded" in this block, a known process.

The demodulated chrominance signals, CR* and CRn, are temporally post processed in the temporal post processing block 1100. The temporal post processing is required to temporally interpolate the field-dropped chrominance (where LD is transmitted in place of chrominance every-other field). The LD/$\overline{CR}$ control signal initiates the temporal filtering sequence of coefficients. The temporal interpolation is a known process. The output of the temporal processor is CRw and CRn, as per HDS/NA specifications discussed in the references incorporated herein.

The demodulated LD signals, LD2 and LD4, are temporally delayed in the temporal delay block 1200. The temporal delay is required to time align the LD components to the temporally prefiltered, and hence temporally delayed, chrominance signals. The amount of delay required is dependent upon the length of the temporal prefilter in the chrominance branch. Luminance temporal post processing, to be described, also introduces a temporal delay to the luminance components. If the luminance and temporal delays are not equal, then the signals with the least amount of delay must be time-aligned to the latest components. The output of the temporal delay is LD2 and LD4, as per HDS/NA specifications.

The luminance high frequency terms, Y1m* and Y3H*, are first temporally post processed. Y1m* and Y3H* are separated into "upper" upper sidebands with the highpass filter blocks 1300 and 1310, respectively.

These filters, known devices, pass the "upper" upper sidebands of Y1m* and Y3H*, Y1m+ and Y3H+ respectively, to the temporal post processing block 1320. The temporal post processing block is a temporal interpolator whose coefficients are sequenced by the LD/$\overline{Y}$ control signal.

Referring back to the bandsplitting blocks, 1300 and 1310, the "lower" upper sidebands are generated by subtracting the "upper" upper sidebands from the delay-equalized filter inputs. This complementary filtering generates Y1m− and Y3H−.

Signals (Y1-Y3)L and Y3L are added in adder 1312 to recreate Y1L.

The luminance processing thereby regenerates Y1L, Y3L, Y1m−, and Y3H−, all of which have not been temporally processed. Therefore, these components must be temporally delay equalized to the "upper" upper sideband signals which have been temporally filtered and hence temporally delayed (as aforementioned, these components must ultimately align with chrominance and LD). Temporal delay block 1325, comprising for example a group of field stores whose length depends upon temporal filtering length, performs the temporal alignment.

The upper sideband of Y1 is reconstituted by combining Y1m− and Y1m+ with the adder device 1330, to form Y1m. Then, Y1n is formed by combining Y1m and Y1L, a process referred to as "frequency stitching", using the known adder 1360. Similarly, adder devices 1340 and 1345 reconstitute Y3H and Y3w respectively.

The LD signal temporally replaces the upper sidebands of Y1n and Y3w and the entire chrominance signal, on a field-alternating basis.

An HDS/NA decoder as described in the references incorporated herein, can then provide a display from the decoded video components, Y1n, Y3w, CRw, CRn, LD2 and LD4.

Overall system performance and parameters are comparable to those described in the parent application however the expansion factor used is 16/3=5.33 as opposed to that described in the parent application of 27/5=5.4, only a 1% change.

New concepts disclosed in this application, motivated by interference issues but also resulting in additional system benefits include:

1. Modulation of I and Q in quadrature on a suppressed carrier "FCR" (Chroma), with I a vestigial sideband (VSB) signal, and Q a double sideband (DSB) signal;
2. Modulation of Y1L and Y3L in quadrature on a suppressed carrier "FYL", both components of the same base bandwidth and DSB. Modulation of two luminance signals in quadrature with each other offers a significant improvement in the performance of the system in a real-world environment.

In the case of luminance, there is particular concern for reconstruction (demodulation) at DC, because a DC error results in a line-alternating "venetian blind" error which is not acceptable (alternating bright and dark lines). By placing both luminance components on the same carrier, the potential for this problem to occur is reduced. When two carriers were used, the potential for problems were larger by a factor of at least two, and even greater, due to compounding of group delay, phase, and gain distortions.

Modulation of Y1L and Y3L in quadrature results in a carrier that statistically carries large peaks of energy, due to the DC and low-frequency content of the luminance image. It is desirable to transmit a "difference" signal in place of one of the quadrature components. For video images with a high degree of vertical correlation, which is statistically frequently-occurring, the difference signal contains little or no energy (consider a flat field, where Y1L=Y3L, and hence [Y1L-Y3L]=0). This result is important for reducing the amount of potential interference in a taboo channel by statistically reducing the overall energy emitted.

Modulation of a difference signal in quadrature with an actual signal is advantageous from the point of view of potential crosstalk upon demodulation at the receiver. For example, assuming that there is a phase error at the demodulator, the difference signal offers the following advantages:

An error on the "real" term, Y3L, is added to the difference signal upon reconstruction of Y1L. That is, assuming an error of "e", demodulation results in {[Y1-L-Y3L]+e1} and {Y3L+e3}, and reconstruction of Y1L results in Y1L+e1+e3. This result is significant for two reasons: firstly, propagating an error is better than creating a "venetian blind" effect, at DC; and secondly, the error in quadrature demodulation results in an imbalance, in the sense that one term's error is larger than the other term's error, and in the described scenario the error is spread (statistically better than not performing this algorithm). In addition, the low-energy difference signal will afford less of a chance for a signal to distort the other quadrature leg.

3. Modulating the DSS package to overlay the position of the NTSC picture carrier in an NTSC co-channel. This allows for protection FROM the strong NTSC picture carrier because the digital audio is rugged and can be readily characterized as to its performance in a noisy channel. Similarly, the digital data appears as white noise when it interferes INTO the NTSC co-channel, because it appears as random data and can be transmitted with significantly less power than the NTSC picture carrier.

4. The USB components of the luminance, Y1H and Y3H, are individually heterodyned to appear as shown in FIG. 7. It should be noted that the previously-described difference of Y1 (that is, for Y1H), without altering the basic concept. Such processing would tend to reduce the amount of energy transmitted for that component (an interference advantage) due to statistical vertical correlation.

Consider first the Y3H component, which at baseband contains information from 3 MHz to 16.96 MHz, with an overlap of 260 kHz below 3 MHz. This signal is heterodyned to the position shown in FIG. 7 by a simple modulator, a known device. For the Y1H (or [Y1-H-Y3H]) component, which at baseband contains information from 3 MHz to 6.8 MHz, with an overlap of 260 kHz below 3 MHz, a heterodyne is performed so as to create the "flipped" USB, as shown in FIG. 7. This flipped configuration is achieved by taking the "lower" image of the modulator (rather than the upper image as is done for the Y3H component), a known filtering process after modulation (passing the lower modulation product rather than the higher product). There is a small notch created at the point where the two extreme points of the Y1H and Y3H vestiges meet. Note that the notch point corresponds to the extreme bound at baseband of 6.8 MHz for Y1H and 16.96 MHz for Y3H, statistically areas void of strong concentration of energy.

In order to provide interference protection FROM and INTO the color subcarrier of the co-channel NTSC signal, note that a natural, though intentional, notch is created at the corresponding position of the NTSC color subcarrier. The notch is due to the natural excursion bound of the USB of the VSB I component.

5. The LD signal is interleaved in the USB of the two luminance vestiges as shown in FIG. 7. This embodiment is achieved by quadrature modulation of LD2 and LD4, and intentionally modulating such that the quadrature carrier falls in the small notch between the extremities of the luminance USB vestiges. A pilot tone may be added at the notch frequency to indicate the existence of LD (may be used later for adaptive decoder detection and processing).

Note that this orientation for LD is the least obtrusive in terms of LD interference into luminance, as compared to the original disclosure, because only ONE sideband of the quadrature pair interferes with each USB of luminance, rather than a DSB signal interfering in each USB of luminance. The extreme interference points INTO the luminance USB's occurs essentially at a higher frequency, yielding a benefit for the luminance sidebands.

6. In general, the simulcast output will require a peaking filter upon transmission (preemphasis) in the vicinity of the NTSC co-channel FM audio signal, so as provide receiver deemphasis of the interfering FM audio carrier. All spectra can be carefully tailored using one-dimensional horizontal emphasis and companding, if required, to fine-tune the broadcast-compatibility of the system. Also, the spectrum will have to be shaped in the vicinity of the LD pilot based upon actual experimentation, in order to achieve reasonable LD signal-to-noise ratios (SNR) without compromising interference issues.

Figure 8:
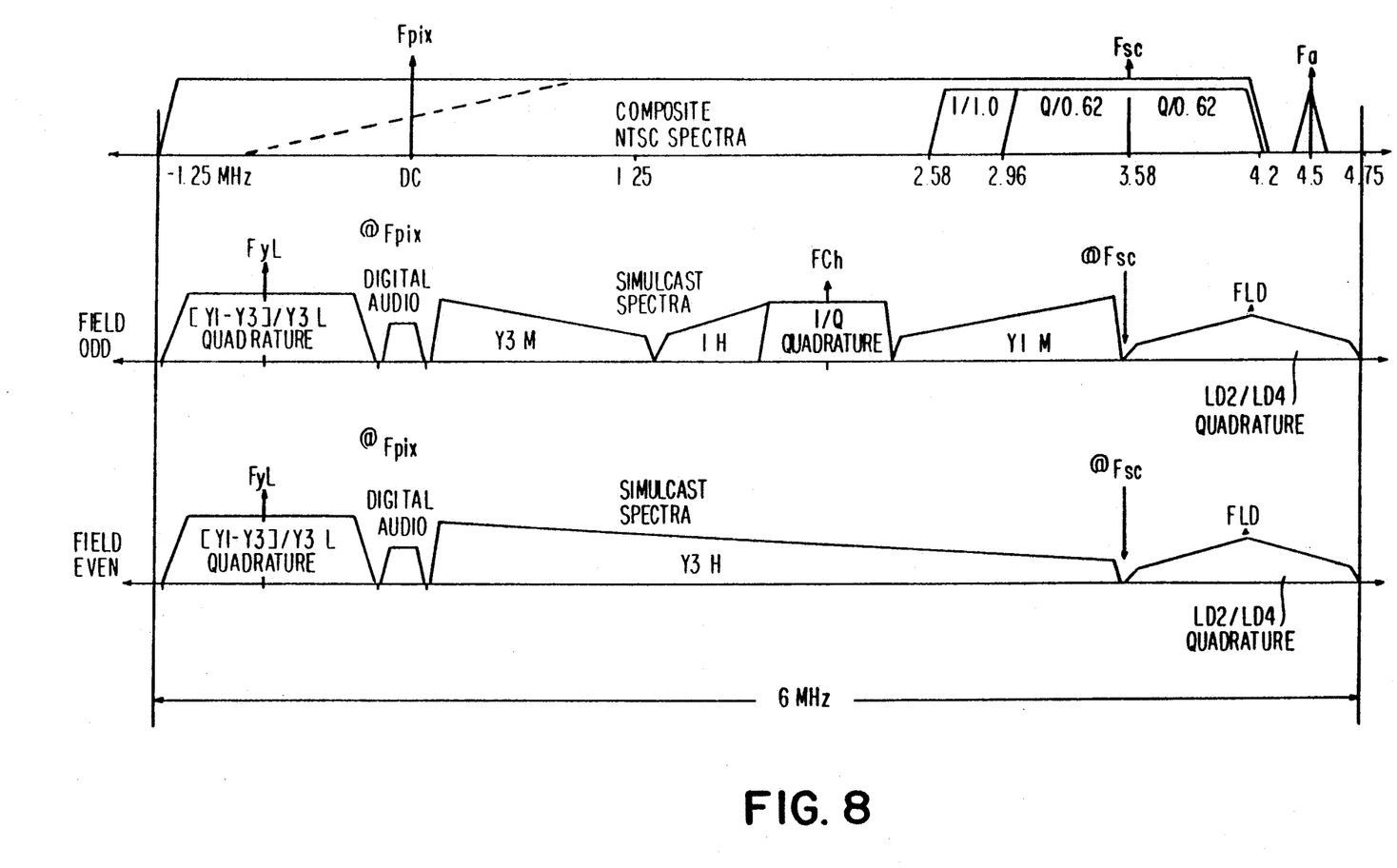
FIG. 8 compares the NTSC transmission spectrum of a conventional television signal with the transmission spectrum of odd and even fields of a second embodiment of an HDS/NA-6 signal configured in accordance with the invention.

FIG. 8 describes a second embodiment of an HDS/NA-6 signal in accordance with the invention and compares it to a composite NTSC frequency spectrum. In this second embodiment, the input video components are bandsplit in slightly a different fashion in accordance with Table C. An encoder and a decoder suitable for performing the modified bandsplit and recombination is similar enough to that disclosed in connection with the first embodiment that it need not be repeated herein. In the second embodiment, the carrier frequency FLD is kept constant in both odd and even fields and only the component positioned between the digital audio portion of the signal (in both odd and even fields) and the notch occurring at Fsc differs as described in FIG. 8 from odd to even fields.

TABLE C

| COMPONENTS | HORIZONTAL RESOLUTION BASEBAND BANDWIDTH (MHz) | TVL/PH |
|---|---|---|
| Y1L | 3.0 | 0 to 88 |
| Y3L | 3.0 | 0 to 88 |
| (Y1−Y3)L | 3.0 | 0 to 88 |
| Y1M | (3.0 to 8.0) | 88 to 236 |
| Y3M | (3.0 to 8.0) | 88 to 236 |
| Y3H+ | (8.0 to 19.1) | 236 to 563 |
| Y3H | (3.0 to 19.1) | 88 to 563 |
| CRn | DC to 2.1 | 0 to 62 |
| CRw | DC to 4.2 | 0 to 124 |
| CRw+ | 2.1 to 4.2 | 62 to 124 |
| CR | VSB 2.1/4.2 | |
| LD | 3.15 | 92 |
| CRw+ | 2.1 to 4.2 | 62 to 124 |

Bandsplitting and packaging the signal in accordance with the second embodiment shown in FIG. 8 can yield an HDS/NA-6 signal then extending horizontal resolution as shown in Table D as follows:

TABLE D

| COMPONENTS | HORIZONTAL RESOLUTION BASEBAND BANDWIDTH (MHz) | TVL/PH |
| --- | --- | --- |
| Y1n | 8.0 | 236 |
| Y3w | 19.1 | 563 |
| CRw ("I") | 4.2 | 124 |
| CRn ("Q") | 2.1 | 62 |
| LD2 | 3.15 | 92 |
| LD4 | 3.15 | 92 |
| Digital Audio | 250 kHz allocated at IF | |

The disclosures and embodiments described herein are purely illustrative and are not intended to be limiting in any way. Alternative embodiments will suggest themselves to those skilled in the relevant art without departing from the spirit and scope of this invention.

We claim:

1. A method for forming a frequency multiplexed television signal suitable for use in a broadcasting environment wherein a conventional television signal comprising a picture carrier and a color subcarrier having respective frequency locations within said conventional television signal is also used, said method comprising the steps of:
   (a) deriving from a television source signal, a plurality of signal components;
   (b) modulating a plurality of subcarriers with a plurality of said signal components; and
   (c) selecting the frequencies of said subcarriers so as to place them in respective frequency locations within said frequency multiplexed television signal least likely to interfere with the picture carrier and color subcarrier of said conventional television signal.

2. The method described in claim 1 wherein said frequency multiplexed television signal comprises a plurality of odd lines and even lines, and wherein said signal components comprise a plurality of luminance signals and a plurality of chrominance signals and wherein said method further comprises the steps of:
   (a) dividing a first luminance component into first and second luminance subcomponents;
   (b) dividing a second luminance component into third and fourth luminance subcomponents;
   (c) deriving from said first and second luminance subcomponents a fifth luminance subcomponent;
   (d) quadrature modulating said third and fifth luminance subcomponents on a first subcarrier having a frequency which places it within a frequency range which will be subject to substantial filtering by a receiver designed to receive said conventional television signal; and
   (e) quadrature modulating said chrominance signals on a second subcarrier.

3. The method of claim 2 wherein said second subcarrier has a frequency which places it outside of the frequency bandwidth of the video portion of said conventional television signal.

4. The method of claim 3 further comprising the steps of:
   (a) deriving a sixth luminance subcomponent from said second luminance subcomponent;
   (b) deriving a seventh luminance subcomponent from said fourth luminance subcomponent;
   (c) combining said sixth luminance subcomponent with a third subcarrier and
   (d) combining said seventh luminance subcomponent with a fourth subcarrier.

5. The method of claim 4 further comprising the steps of:
   (a) deriving from said television source signal, a plurality of line difference components; and
   (b) quadrature modulating said line difference components on a fifth subcarrier.

6. The method of claim 5 wherein a first group of said subcarriers are frequency multiplexed on said odd lines and a second group of said subcarriers are frequency multiplexed on said even lines.

7. The method of claim 6 further comprising the step of frequency multiplexing a digital audio signal as part of said frequency multiplexed television signal 8. An apparatus for forming a frequency multiplexed television signal suitable for use in a broadcasting environment wherein a conventional television signal comprising a picture carrier and a color subcarrier having respective frequency locations within said conventional television signal is also used, said apparatus comprising in combination:
   (a) means for deriving from a television source signal, a plurality of signal components;
   (b) means for modulating a plurality of subcarriers with a plurality of said signal components; and
   (c) means for selecting the frequencies of said subcarriers so as to place them in respective frequency locations within said frequency multiplexed television signal least likely to interfere with the picture carrier and color subcarrier of said conventional television signal.

9. The apparatus described in claim 8 wherein said frequency multiplexed television signal comprises a plurality of odd lines and even lines, and wherein said signal components comprise a plurality of luminance signals and a plurality of chrominance signals, said apparatus further comprising:
   (a) first dividing means for dividing a first luminance component into first and second luminance subcomponents;
   (b) second dividing means coupled to said first dividing means, for dividing a second luminance component into third and fourth luminance subcomponents;
   (c) first deriving means coupled to said first dividing means, for deriving from said first and second luminance subcomponents a fifth luminance subcomponent;
   (d) first modulating means coupled to said first deriving means, for quadrature modulating said third and fifth luminance subcomponents on a first subcarrier having a frequency which places it within a frequency range which will be subject to substantial filtering by a receiver designed to receive said conventional television signal; and
   (e) second modulating means coupled to said first modulating means, for quadrature modulating said chrominance signals on a second subcarrier.

10. The apparatus of claim 9 wherein said second subcarrier has a frequency which places it outside of the frequency bandwidth of the video portion of said conventional television signal.

11. The apparatus of claim 10 further comprising:

(a) second deriving means coupled to said first dividing means, for deriving a sixth luminance subcomponent from said second luminance subcomponent;

(b) third deriving means coupled to said second dividing means, for deriving a seventh luminance subcomponent from said fourth luminance subcomponent;

(c) first combining means coupled to said second deriving means, for combining said sixth luminance subcomponent with a third subcarrier and (d) second combining means coupled to said second dividing means, for combining said seventh luminance subcomponent with a fourth subcarrier.

12. The apparatus of claim 11 further comprising:

(a) fourth deriving means, for deriving from said television source signal, a plurality of line difference components; and (b) third modulating means coupled to said fourth deriving means, for quadrature modulating said line difference components on a fifth subcarrier.

13. An apparatus for providing a television display from the frequency multiplexed signal of claim 8, said apparatus comprising:

(a) means for deriving from said frequency multiplexed signal, said signal components; and (b) means for combining said signal components to form said television display.

14. An apparatus for providing a television display from the frequency multiplexed television signal of claim 9 comprising:

(a) first deriving means, for deriving from said frequency multiplexed signal, said first and second subcarriers;

(b) second deriving means coupled to said first deriving means, for deriving from said first and second subcarriers said plurality of luminance components and said plurality of chrominance components; and (c) means coupled to said first and second deriving means, for combining said luminance and chrominance components to form said television display.

15. An apparatus for providing a television display from the frequency multiplexed television signal of claim 10 comprising:

(a) first deriving means, for deriving from said frequency multiplexed signal, said first and second subcarriers;

(b) second deriving means coupled to said first deriving means, for deriving from said first and second subcarriers said plurality of luminance components and said plurality of chrominance components; and (c) means coupled to said first and second deriving means, for combining said luminance and chrominance components to form said television display.

16. An apparatus for providing a television display from the frequency multiplexed television signal of claim 11 comprising:

(a) first deriving means, for deriving from said frequency multiplexed signal, said first, second, third and fourth subcarriers;

(b) second deriving means coupled to said first deriving means, for deriving from said first, second, third and fourth subcarriers said plurality of luminance components and said plurality of chrominance components; and (c) means coupled to said first and second deriving means, for combining said luminance and chrominance components to form said television display.

17. An apparatus for providing a television display from the frequency multiplexed television signal of claim 12 comprising:

(a) first deriving means, for deriving from said frequency multiplexed signal, said first, second, third, fourth and fifth subcarriers;

(b) second deriving means coupled to said first deriving means, for deriving from said first, second, third and fourth subcarriers said plurality of luminance components and said plurality of chrominance components;

(c) third deriving means coupled to said first deriving means, for deriving from said fifth subcarrier, said plurality of line difference signals; and (d) means coupled to said first, second and third deriving means, for combining said luminance and chrominance components and said line difference signals to form said television display.

* * * * *